Patented June 30, 1942

2,288,306

UNITED STATES PATENT OFFICE 2,288,306

PRODUCTION OF CONDENSATION PRODUCTS

Hans Wagner, Frankfort-on-the-Main, Germany, assignor to the firm of Chemical Marketing Company, Inc., New York, N. Y.

No Drawing. Application January 21, 1941, Serial No. 375,364. In Germany January 29, 1940

6 Claims. (Cl. 260—593)

The present invention relates to the production of unsaturated condensation products of formaldehyde with oxo compounds, that is the aldehydes above formaldehyde and ketones. It is particularly directed to the production of acrolein and its homologues, or to the production of unsaturated ketones having a terminal vinyl group.

The reaction of formaldehyde with oxo compounds is well known. In the past, the practice has been to conduct the reagents over various catalysts in the vapor phase. In the past, however, the yields of the reaction have been comparatively low, and the catalysts have quickly become inactive so that frequent regeneration was necessary.

The primary object of the present invention is to provide a process for causing the condensation of formaldehyde with oxo compounds which operates with a high yield. The process in fact produces yields of as high as 90% or more.

A further object of the invention is to provide a process which requires very infrequent regeneration of the catalysts, this being necessary only after periods of 120 hours or even much longer periods.

The invention consists primarily in the use of a new catalyst in the vapor phase condensation of formaldehyde with the oxo compounds.

It has been found that formaldehyde condenses very easily with an oxo compound when a mixture of vapors of the two is passed over a catalyst which contains as its principal effective ingredient an alkaline earth phosphate, or a mixture of such phosphates. The side reactions which are likely to occur with the use of other catalysts are to a great extent avoided by the use of this particular type of catalyst.

The action of the catalyst may be improved to some degree by the addition of relatively small amounts of magnesium phosphate, lithium phosphate or aluminium phosphate to the alkaline earth phosphate.

A further increase in the activity of the catalyst may be produced by soaking the catalyst, after it is prepared, in an alkaline solution such as a solution of sodium carbonate, or with a solution or dilute soda lye, sodium acetate, trisodium phosphate or the like. Both the yield and the effective life of the catalyst are increased to some degree by this procedure. The catalyst may be used in a compressed form, or may be precipitated on a carrier.

For the precipitation of a catalyst according to the invention, such as for example tricalcium phosphate, a calcium salt such as calcium chloride, calcium nitrate or calcium formate is dissolved in water, and admixed with phosphoric acid; then ammonia is added and the phosphate is precipitated. Soda or some other alkaline substance may also be used for precipitating the catalyst. The precipitated phosphate is then dried and compressed.

On the other hand, for preparing a catalyst upon a carrier, calcium phosphate may be dissolved in an acid such as formic acid. A suitable carrier material such as pumice, clay or aluminium oxide is soaked in this solution and the solution is then evaporated. The resulting catalyst adheres strongly to the carrier, and is efficient for periods of 120 hours or more without regeneration.

Mixtures of calcium phosphate with small amounts of aluminium phosphate, preferably not exceeding about 5%, or mixtures of calcium phosphate with aluminium phosphate and lithium phosphate have been found particularly effective. Calcium phosphate and magnesium phosphate mixed in the ratio of about 9 to 1 also produce a high yield while having a very long life. Calcium phosphate containing from 0.01% to 20% of lithium phosphate is also an excellent catalyst.

In carrying out the process, the reagents in vapor phase are led over the catalysts. Preferably this takes place at normal pressure, although pressures above or below normal can be used. The temperature of the vapors passing over the catalysts is preferably between 200° C. and 400° C. The yield may be somewhat reduced by lower temperatures, and undesirable secondary reactions may occur to some extent at higher temperatures.

In order to prevent polymerization of the resulting products it is often helpful to cool the gases quickly after their conversion. In some cases also it may be helpful to add diluting agents such as water vapor or the like to prevent possible decomposition of the products of the reaction.

Instead of formaldehyde, the process is equally applicable to its acetals such as formaldehyde dimethyl acetal.

The reaction may be carried out even in the presence of water, utilizing the normal aqueous commercial formaldehyde. In some instances, however, it is better to avoid the presence of water entirely or to a great extent, in order to prevent the occurrence of the Cannizzaro reaction. For example paraformaldehyde may be dissolved in acetaldehyde, and the mixture may be vaporized and passed over the catalyst.

The following examples are given only to show some methods of carrying out the process and disclose effective procedures therefor.

Example 1

10 kg. of aqueous 30% formaldehyde are thoroughly mixed at 10° C. with 4.4 kg. acetaldehyde in a mixer provided with cooling coils. The aldehyde mixture is heated in a vaporizer at 100° C.–110° C. and the resulting vapors are preheated in a superheater to 300° C.–310° C. These vapors are led at substantially these temperatures over a catalyst consisting of 99% tricalcium phosphate and 1% lithium phosphate. 6.5 kg. of the aldehyde mixture are passed over the catalyst per hour, the volume of the catalyst being 25 liters. The yield of acrolein is more than 90% calculated on the acetaldehyde and more than 80% calculated on the formaldehyde.

Example 2

10 kg. of formaldehyde are mixed with 56 kg. propionic aldehyde in the same manner as in Example No. 1, while cooling, the mixture is vaporized and then led over a catalyst at 300° C.–310° C. As a catalyst, a calcium phosphate precipitated on pumice is employed. A methacrolein yield of 96% calculated on the formaldehyde is obtained. The procedure can be carried on for from 200 to 250 hours before regeneration of the catalyst is necessary.

In this example it is desirable to work with a slight excess of propionic aldehyde in order to avoid possible secondary reactions.

Example 3

Molecular amounts of methyl ethyl ketone and formaldehyde are led in vapor form over a catalyst consisting of calcium phosphate containing 5% of aluminium phosphate at about 310° C. A yield of over 80% calculated on the methyl ethyl ketone and of 70% calculated on the formaldehyde is obtained.

The reaction products contain some formaldehyde and methyl ethyl ketone. The materials can be separated in the normal manner by fractional distillation. Often the mixture has some utility without such separation.

While I have described herein some embodiments of my invention I wish it to be understood that I do not intend to limit myself thereby except within the scope of the appended claims.

I claim:

1. A process for the production of unsaturated condensation products of formaldehyde and its acetals with oxo compounds, which comprises passing a mixture of a substance selected from the group consisting of formaldehyde and its acetals, and an oxo compound, in vapor phase over a catalyst containing as its essential ingredient calcium phosphate.

2. A process for the production of unsaturated condensation products of formaldehyde and its acetals with oxo compounds, which comprises passing a mixture of a substance selected from the group consisting of formaldehyde and its acetals, and an oxo compound, in vapor phase at temperatures between about 200° C. and 400° C. over a catalyst containing as its essential ingredient tricalcium phosphate.

3. A process for the production of unsaturated condensation products of formaldehyde and its acetals with oxo compounds, which comprises passing a mixture of a substance selected from the group consisting of formaldehyde and its acetals, and an oxo compound, in vapor phase at temperatures between about 200° C. and 400° C. over a catalyst containing as its essential ingredient a mixture of calcium phosphate with a small amount not exceeding about 20% of a substance selected from the group consisting of lithium phosphate, aluminium phosphate and magnesium phosphate.

4. A process for the production of unsaturated condensation products of formaldehyde and its acetals with oxo compounds, which comprises passing a mixture of a substance selected from the group consisting of formaldehyde and its acetals, and an oxo compound, in vapor phase at temperatures between about 200° C. and 400° C. over a catalyst containing as its essential ingredient a mixture of tricalcium phosphate with a small amount not exceeding about 20% of a substance selected from the group consisting of lithium phosphate, aluminium phosphate and magnesium phosphate.

5. A process for the production of unsaturated condensation products of formaldehyde and its acetals with oxo compounds, which comprises passing a mixture of a substance selected from the group consisting of formaldehyde and its acetals, and an oxo compound, in vapor phase at temperatures between about 200° C. and 400° C. over a catalyst comprising tricalcium phosphate which has been soaked in an alkaline solution.

6. A process for the production of unsaturated condensation products of formaldehyde and its acetals with oxo compounds, which comprises passing a mixture of a substance selected from the group consisting of formaldehyde and its acetals, and an oxo compound, in vapor phase at temperatures between about 200° C. and 400° C. over a catalyst comprising tricalcium phosphate precipitated on a carrier.

HANS WAGNER.